B. E. TOTTY.
COMBINATION IMPLEMENT.
APPLICATION FILED JULY 23, 1910.
1,004,312.
Patented Sept. 26, 1911.
2 SHEETS—SHEET 1.
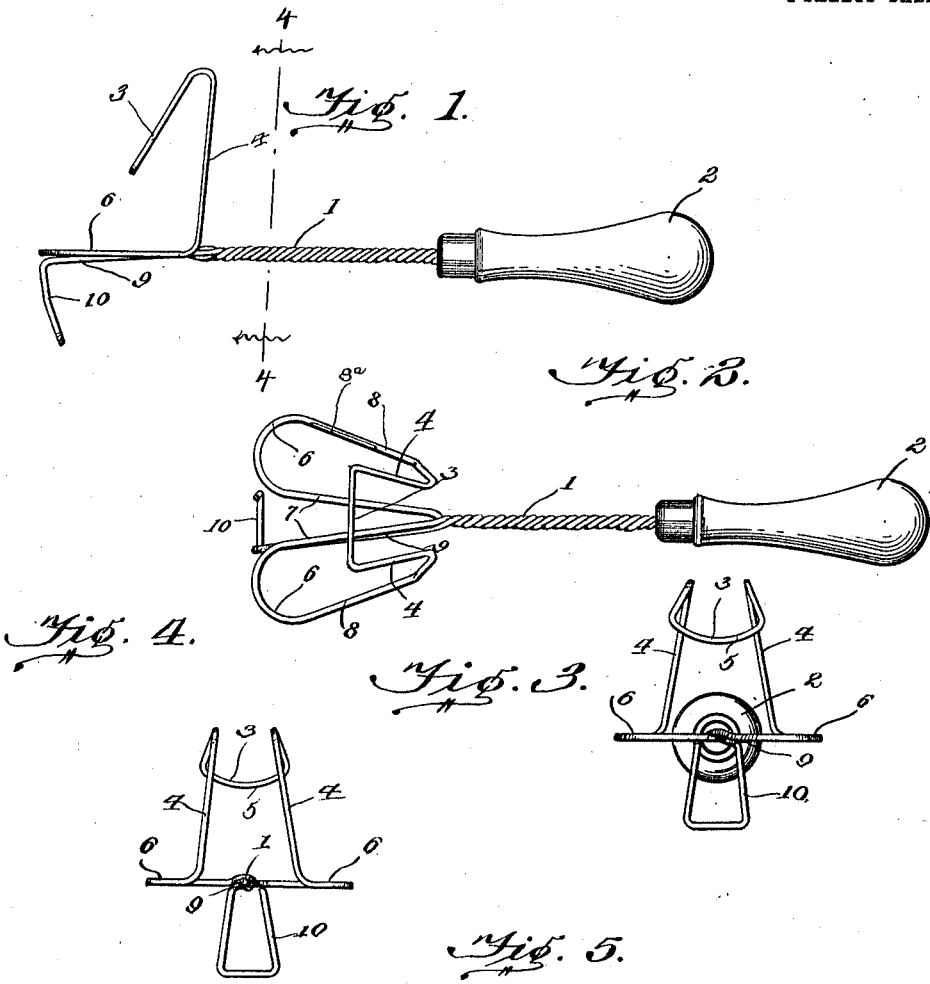
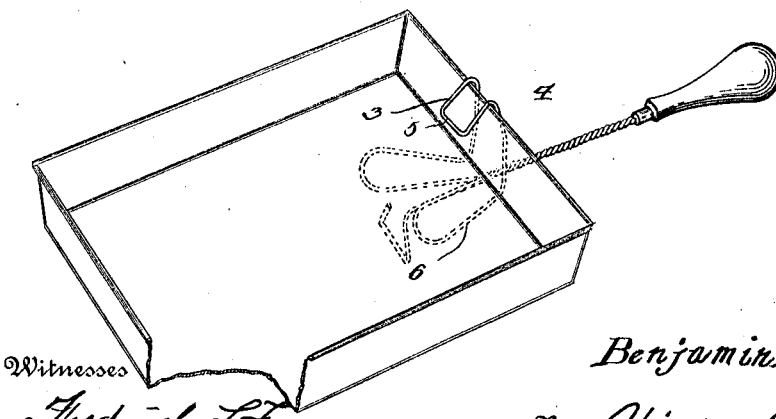
Witnesses
Frederick L. Fox.
C. A. Hines.
Inventor
Benjamin E. Totty.
By Victor J. Evans
Attorney

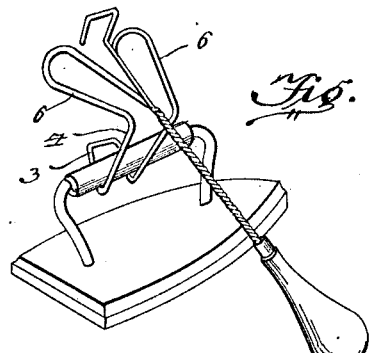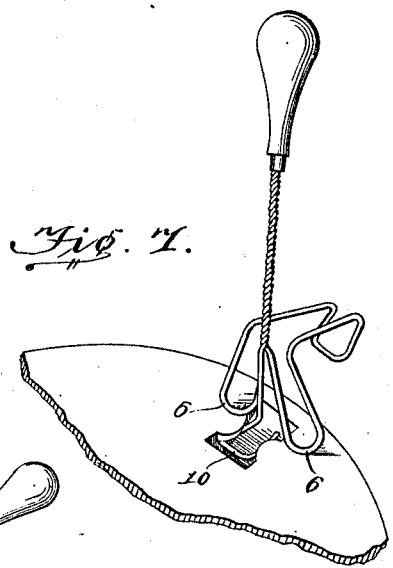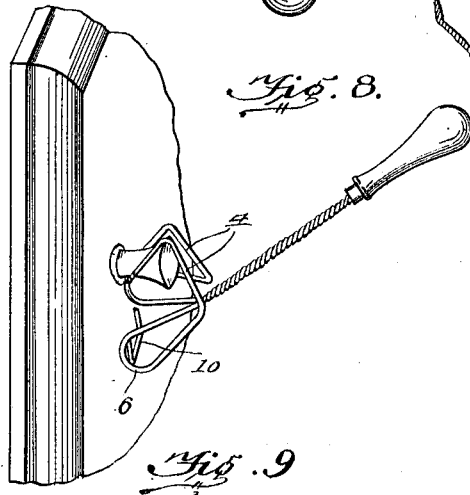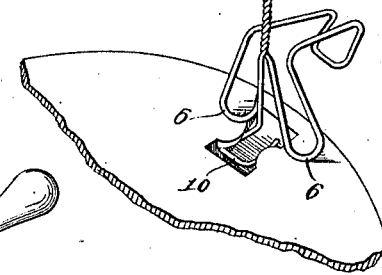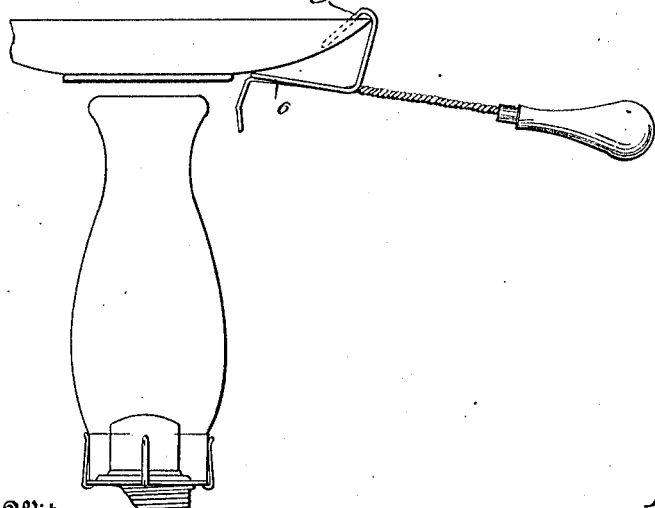

UNITED STATES PATENT OFFICE.

BENJAMIN E. TOTTY, OF RICHMOND, VIRGINIA.

COMBINATION IMPLEMENT.

1,004,312.  Specification of Letters Patent.  Patented Sept. 26, 1911.

Application filed July 23, 1910. Serial No. 573,392.

*To all whom it may concern:*

Be it known that I, BENJAMIN E. TOTTY, a citizen of the United States, residing at Richmond, in the county of Henrico and State of Virginia, have invented new and useful Improvements in Combination Implements, of which the following is a specification.

This invention relates to combination implements for culinary and general household use, the object of the invention being to provide a simple and inexpensive construction of device especially designed for lifting and handling pots and pans, but which is also adapted for a variety of other purposes, rendering it particularly convenient and useful as a general househould tool.

In the accompanying drawings:—Figure 1 is a view in side elevation of a combination implement embodying my invention. Fig. 2 is a top plan view of the same. Fig. 3 is a front elevation of the implement. Fig. 4 is a transverse section on the line 4—4 of Fig. 1. Figs. 5 to 9, inclusive, are views showing some of the various uses for which the device is adapted.

For convenience in setting forth the relative positions of the parts of the tool in the following detailed description, I have employed the terms "forwardly", "downwardly", etc., as indicating the position of the parts relative to the handle and shank when the tool is disposed in the horizontal position shown in Fig. 1.

The implement is preferably made of one or more pieces of stout spring wire and includes a shank 1 on which may be fitted a suitable handle 2. As shown in the present instance, the shank is composed of twisted portions of the wire or wires, but such particular construction is not essential.

In the particular embodiment of the invention disclosed, the device is formed, exclusively of the handle, of two lengths of wire of suitable size or gage. The intermediate portion of one of the wires, which is doubled upon itself, is bent to provide a forwardly and downwardly projecting loop-shaped hook 3, the sides of which converge upwardly and rearwardly and connect with longitudinally curved upright supporting arms 4, adapted to bear against the side wall or flange of a pan or vessel to be lifted, the bight 5 of the hook 3 being slightly offset inwardly to engage under the rim edge of the vessel.

From the lower ends of the arms 4 the wire referred to is bent forwardly and then returned or bent rearwardly, forming longitudinally extending loop-shaped portions 6 which are horizontally disposed and constitute lifting elements adapted to extend under the pan or vessel, each of said looped portions embodying inner longitudinal relatively stationary jaws 7 and outer resilient jaws 8, the rear ends of the jaws 7 connecting with the terminals of the wire forming part of the shank 1, while the rear ends of the jaws 8 connect with the lower ends of the arms 4. The bights or closed ends of the loops 6 terminate substantially in transverse alinement with each other at the front end of the implement. One of the jaws 8 is formed with a rib or bearing lip $8^a$.

The second wire employed in the construction of the implement herein shown has its inner or rear end arranged to form part of the shank 1 and suitably connected with the portions of the other wire completing the shank, as by twisting them together in the present illustration. The outer or forward end of this second wire forms an arm 9 which extends at a downward and forward angle of inclination beneath the inner jaw 7 of one of the loops 6.

At the forward end of the arm 9 the wire is bent downward, laterally and upward to form a loop-shaped secondary or supplemental hook 10, which is bent or curved downwardly and rearwardly for effective engagement with an object. The sides of this hook 10 converge upwardly, the upper end of said hook being open and arranged below the space between the bights of the loops 6. The main hook 3 is also open at its upper end, as shown, and its sides converge upwardly, thus adapting it for other uses than the one before stated, as hereinafter described.

Fig. 5 illustrates the mode of application of the device for lifting or transporting a pan or other like utensil. As shown, the portions 6 project beneath the bottom of the pan and bear against the same, while the arms 4 bear against the flange or vertical wall of the same, and the hook 3 projects over and engages the rim edge of said flange or wall, thus holding the pan securely so that it may be readily lifted and transported. The tool is applied in an obvious manner by first fitting the hook 3 over the rim edge of the flange at an angle and then tilting the device to project the loops 6 under the bottom of the pan.

In the manner above described the pots, pans and other culinary utensils of different sizes within reasonable limits may be easily and conveniently handled. The supplemental hook 10 may be employed for withdrawing pots and pans from a hot oven so that they may be engaged and lifted in the manner described, in which operation the tool is inserted within the oven and the hook 10 engaged over the rim edge of the pan in an obvious manner, so that upon pulling outward on the implement the pan may be partially withdrawn for the purpose described.

Fig. 6 shows another use of the device for lifting and transporting hot irons and other articles and utensils provided with handles. In this use of the tool the hook 3 is engaged with the handle of the article which is brought to lie in the space between the same and the arms 4 and loops 6, so that said article will be firmly held and may thus be lifted and carried in a secure manner.

In Fig. 7 I have shown the mode of use of the device as a stove-lid lifter. As shown, the supplemental hook 10 in this instance is engaged with the recess in the lid and the bights of the loops 6 are brought to bear against the surface of the lid to retain the hook in position, whereby the lid may be readily lifted and carried.

In Fig. 8 I have shown the device applied to the knob or handle of a hot stove door or other object, whereby the door may be opened or adjusted without liability of burning the hand. In this use of the device the hook 3 is engaged with the stem of the knob by slipping it upward so that the outer enlarged end of the knob lies behind the arms 4 and the portion 5 bears against the base of the knob stem and the hook 10 against the door below the knob, allowing the door to be drawn open.

In Fig. 9 I have shown the device used as a handle for holding a saucer or other similar shallow vessel above a lamp or other heater to heat the contents of the vessel. In this mode of use the device is disposed at an angle as shown, the hook 3 being engaged with the rim edge of the vessel, while the bights of the loops 6 project beneath the vessel and support the same.

In the foregoing and other ways the device may be employed for various other useful services, all obtained as a result of the construction disclosed, whereby a simple and effective type of implement having a wide range of general use is provided.

Having thus described my invention, I claim:—

1. An implement of the character described comprising a shank, looped portions extending beyond diametrically opposite sides of the shank, arms extending at right angles from the inner ends of said looped portions, a loop-shaped hook arranged at the outer ends of said arms and projecting toward the shank and looped portions, and a second hook arranged adjacent the outer ends of the looped portions at the side thereof opposite the first-named hook and projecting in a direction away from said looped portions.

2. An implement of the character described comprising a shank, longitudinally disposed looped portions at diametrically opposite sides of the shank, each comprising inner stationary and outer resilient jaws, arms extending at right angles from the inner ends of the resilient jaws, a hook at the outer ends of said arms and projecting toward the looped portions, a longitudinally extending arm disposed on the opposite side of one of said loops from said hook, and a hook carried by said arm and arranged adjacent the outer ends of the loops.

3. An implement of the character described comprising a shank, longitudinally disposed looped portions at diametrically opposite sides of the shank, each comprising inner stationary and outer resilient jaws, arms projecting at right angles from the inner ends of the resilient jaws, a loop-shaped hook projecting toward the looped portions from the ends of said arms, said hook having its side arms converging toward its outer or open end, an arm extending at an inclination from the shank on the opposite side of one of the longitudinal loops from said hook, and a second loop-shaped hook at the outer end of said arm and arranged adjacent the outer ends of the looped portions and also having its sides converging toward the inner or open end.

In testimony whereof I affix my signature in presence of two witnesses.

BENJAMIN E. TOTTY.

Witnesses:
JOSEPH E. SIMS,
EARNEST S. JOHNS.

---

Copies of this patent may be obtained for five cents each, by addressing the "Commissioner of Patents, Washington, D. C."